US009126815B2

(12) United States Patent
Cooper et al.

(10) Patent No.: US 9,126,815 B2

(45) Date of Patent: Sep. 8, 2015

(54) METHOD AND SYSTEM FOR SECURING AND REMOVING A LIQUID MOLDING SYSTEM VALVE FROM A BEVERAGE DISPENSER

(71) Applicant: Manitowoc Foodservice Companies, LLC, Manitowoc, WI (US)

(72) Inventors: Anthony Austin Cooper, La Grange, KY (US); Gregory Alan Myer, Charlestown, IN (US); Peter Boyd, Jeffersonville, IN (US); Shannon Baity, New Albany, IN (US); John Bragg, Jeffersonville, IN (US); Michael Merritt, Louisville, IN (US)

(73) Assignee: Manitowoc Foodservice Companies, LLC, Manitowoc, WI (US)

( * ) Notice: Subject to any disclaimer, the term of this patent is extended or adjusted under 35 U.S.C. 154(b) by 0 days.

(21) Appl. No.: 14/134,210

(22) Filed: Dec. 19, 2013

(65) Prior Publication Data

US 2014/0182715 A1 Jul. 3, 2014

Related U.S. Application Data

(60) Provisional application No. 61/745,070, filed on Dec. 21, 2012, provisional application No. 61/804,929, filed on Mar. 25, 2013.

(51) Int. Cl.

*F16K 21/04* (2006.01)

*B67D 1/00* (2006.01)

(52) U.S. Cl.

CPC ............ *B67D 1/0081* (2013.01); *B67D 1/0021* (2013.01); *B67D 2001/0097* (2013.01); *B67D 2210/0006* (2013.01); *Y10T 137/7837* (2015.04)

(58) Field of Classification Search

USPC .................. 222/494, 129.1; 137/511, 315.33

See application file for complete search history.

(56) References Cited

U.S. PATENT DOCUMENTS

| | | | | | |
|---|---|---|---|---|---|
| 2,552,933 | A * | 5/1951 | Browne | .......................... | 241/92 |
| 3,987,715 | A * | 10/1976 | Muller | ............................ | 99/275 |
| 4,027,783 | A * | 6/1977 | Branch et al. | ................... | 222/26 |
| 5,531,363 | A * | 7/1996 | Gross et al. | ................... | 222/494 |
| 5,960,701 | A | 10/1999 | Reese et al. | | |
| 6,273,296 | B1 * | 8/2001 | Brown | ............................ | 222/92 |

(Continued)

OTHER PUBLICATIONS

International Search Report dated May 5, 2014 for PCT application No. PCT/US2013/076457.

(Continued)

*Primary Examiner* — Donnell Long

(74) *Attorney, Agent, or Firm* — Ohlandt, Greeley, Ruggiero & Perle, LLP

(57) ABSTRACT

Disclosed is a beverage system having an ingredient module and an ingredient dispensing valve assembly in communication with the ingredient module via at least one ingredient conduit, in which the ingredient dispensing valve assembly includes a dispensing manifold with at least one dispensing valve having a through-hole, an insert disposed within the through-hole, and a valve disposed between the insert and the dispensing valve, with the dispensing valve having a body portion and the insert is removeably connected to the body portion. The insert can be secured to the body portion of the dispensing valve by a locking mechanism, with the locking mechanism providing for removing or securing the valve from between the body portion of the dispensing valve and the insert by hand.

5 Claims, 11 Drawing Sheets

(56) References Cited

U.S. PATENT DOCUMENTS

| | | | | |
|---|---|---|---|---|
| 8,397,958 | B2 * | 3/2013 | Smith et al. | 222/494 |
| 8,733,600 | B2 * | 5/2014 | Pritchard | 222/501 |
| 2006/0249536 | A1 * | 11/2006 | Hartman et al. | 222/129.3 |
| 2009/0212078 | A1 * | 8/2009 | Gaus | 222/490 |
| 2009/0230149 | A1 | 9/2009 | Smeller et al. | |
| 2010/0133273 | A1 * | 6/2010 | Thurman et al. | 220/260 |
| 2011/0168738 | A1 | 7/2011 | Nevarez et al. | |

OTHER PUBLICATIONS

Written Opinion dated May 5, 2014 for PCT application No. PCT/US2013/076457.

* cited by examiner

METHOD AND SYSTEM FOR SECURING AND REMOVING A LIQUID MOLDING SYSTEM VALVE FROM A BEVERAGE DISPENSER

CROSS REFERENCE TO RELATED APPLICATION

This application is related and claims priority to provisional applications Ser. No. 61/745,070 filed on Dec. 21, 2012 and 61/804,929 filed on Mar. 25, 2013, the disclosure of which are incorporated herein as if fully set forth verbatim herein.

BACKGROUND OF THE DISCLOSURE

1. Field of the Disclosure

The present disclosure relates generally to a mechanism for securing and removing a liquid molding system (LMS) valve to a beverage flavor/ingredient dispensing manifold. The present disclosure provides for easier removal and installation of such LMS valves.

2. Description of Related Art

Conventionally, LMS valves are very difficult to change. As service technicians typically have to remove a large number of parts to gain access to the LMS valves, it becomes costly and time consuming to change and reinstall LMS valves. Since LMS valves need to be cleaned at regular intervals, and certainly replaced on an annual basis, owners of beverage dispensing system that include LMS valves find the cleaning and/or annual replacement to be costly in terms of both service costs and the costs involved in taking the beverage dispenser device out of service for a long period of time to allow for the replacement of the LMS valves.

Conventional LMS valves are disclosed in U.S. Patent Publication Nos. 2011/0073615 and 2011/0073618, both of which are incorporated herein in their entirety by reference thereto.

The present disclosure overcomes the costly and time consuming issues related to the cleaning and/or replacement usually encountered with conventional LMS valves by allowing the rapid removal of the LMS valves for replacement or cleaning without the need for tools. This, in turn, means that owners will no longer require the assistance of a service technician, as a restaurant employee should be able to readily replace the LMS valves. The benefits of the present disclosure are provided by a novel insert that holds the LMS valves in place by, preferably, a twisting and locking action. The novel insert can be readily manually removed without the need for tools, thus making the removal of the LMS valves rapid and capable to be performed without the need of a skilled and expensive service technician.

SUMMARY OF THE DISCLOSURE

One embodiment of the present disclosure provides an insert utilizing a twist-and-lock mechanism for allowing removing or securing an LMS valve to a manifold of one or more beverage dispensing nozzles. The insert preferably also has key and lock portions that prevent the insert from rotating out of position. This also prevents inadvertent movement of the LMS valve and possible leakage of beverages passing from the beverage dispensing nozzle through the LMS valve.

Another embodiment of the present disclosure provides an ingredient dispensing valve assembly comprising: a dispensing manifold with at least one throughhole, an insert disposed removeably connected to the manifold and in fluid communication with the through-hole, and an LMS valve disposed between the manifold and the insert, wherein the LMS valve is secured between the manifold and the insert via a twist-and-lock mechanism. The twist-and-lock mechanism allows for removing or securing the LMS valve from and to the dispensing manifold without the need for tools.

A further embodiment of the present disclosure provides a beverage system comprising: an ingredient module and an ingredient dispensing valve assembly in communication with the ingredient module via at least one ingredient conduit, wherein the ingredient dispensing valve assembly comprises: a dispensing manifold with at least one through-hole, an insert disposed removeably connected to the manifold and in fluid communication with the through-hole, and an LMS valve disposed between the manifold and the insert, wherein the LMS valve is secured between the manifold and the insert via a twist-and-lock mechanism. The twist-and-lock mechanism allows for removing or securing the LMS valve from and to the dispensing manifold. The ingredient module comprises a housing, an ingredient container disposed within the housing, an ingredient conduit disposed between the ingredient container and the ingredient dispensing valve assembly, and a pumping device that provides sufficient pressure to cause the ingredient to move from the ingredient container through the ingredient conduit and through the ingredient dispensing valve assembly.

Another embodiment of the present disclosure provides for removeably affixing the inserts to the dispensing manifold by a "threaded" concept that provides more than a quarter turn for removeably affixing the insert to the dispensing manifold. Other embodiments of the present disclosure for removeably affixing the inserts to the dispensing manifold include: providing inserts that snap fit into place; providing inserts that are held in position by friction, such as via an O-ring; and providing inserts that are supported from the bottom of the dispensing manifold but are not affixed directly to the manifold. All such embodiments will become clear to those of skill in the art based upon the present disclosure.

Typically, LMS valves are used in an integrated beverage blending system comprising: an ice portion control module; an ingredient module; an ice dispensing conduit in communication with the ice portion control module; and an ingredient dispensing valve assembly, wherein ice is dispensed into a beverage container via the ice dispensing conduit and ingredient is dispensed into a beverage container via the ingredient dispensing valve assembly through the LMS valve, wherein the LMS valve is removably connected to the ingredient dispensing valve assembly, and wherein the ingredient module comprises a housing, an ingredient container disposed within the housing, a first ingredient conduit disposed between the ingredient container and the ingredient dispensing valve assembly, and a pumping device that provides sufficient pressure to cause the ingredient to move from the ingredient container through the first ingredient conduit, and through the ingredient dispensing assembly and LMS valve. The ingredient module generally includes an expansion valve that receives the ingredient from the pumping device and passes the ingredient to the dispensing valve assembly and LMS valve, wherein the expansion valve includes a second ingredient conduit and a diaphragm, wherein the diaphragm controls the cross-sectional size of the second ingredient conduit in the expansion valve, such that the second ingredient conduit is reduced in cross-section during dispensing of the ingredient to the dispensing valve assembly and enlarged in cross-section when the dispensing of the ingredient to the dispensing valve assembly and LMS valve is terminated, and wherein each ingredient conduit is isolated from other ingredient conduits and the ice dispensing conduit, whereby product and/or flavor contamination is avoided.

The above-described and other advantages and features of the present disclosure will be appreciated and understood by those skilled in the art from the following detailed description, drawings, and appended claims.

BRIEF DESCRIPTION OF THE DRAWINGS

Further advantageous features and details of the present disclosure will become apparent to those of skill in the art from the following description of the drawings, in which.

DETAILED DESCRIPTION OF THE DISCLOSURE

The LMS valve according to the present disclosure is used in an integrated beverage dispense and mix/blend assembly, wherein the assembly typically comprises: a flavor/ingredient dispensing module, an ice maker, ice storage and portion control module, and a pair of blender/mixer/cleaning modules disposed on opposite sides of a dispensing nozzle. Further aspects of this integrated beverage dispense and mix/blend assembly are discussed in greater detail in co-pending U.S. patent application Ser. No. 12/823,985, filed on Jun. 25, 2010; Ser. No. 12/633,790, filed on Dec. 8, 2009, Ser. No. 12/633,786, filed on Dec. 8, 2009; Ser. No. 12/633,763, filed on Dec. 8, 2009; Ser. No. 12/633,766, filed on Dec. 8, 2009; Ser. No. 12/633,793, filed on Dec. 8, 2009; Ser. No. 12/633,772, filed on Dec. 8, 2009; and Ser. No. 13/541,307, filed on Jul. 3, 2012, all of which are herein incorporated by reference in their entirety.

Figure 1:
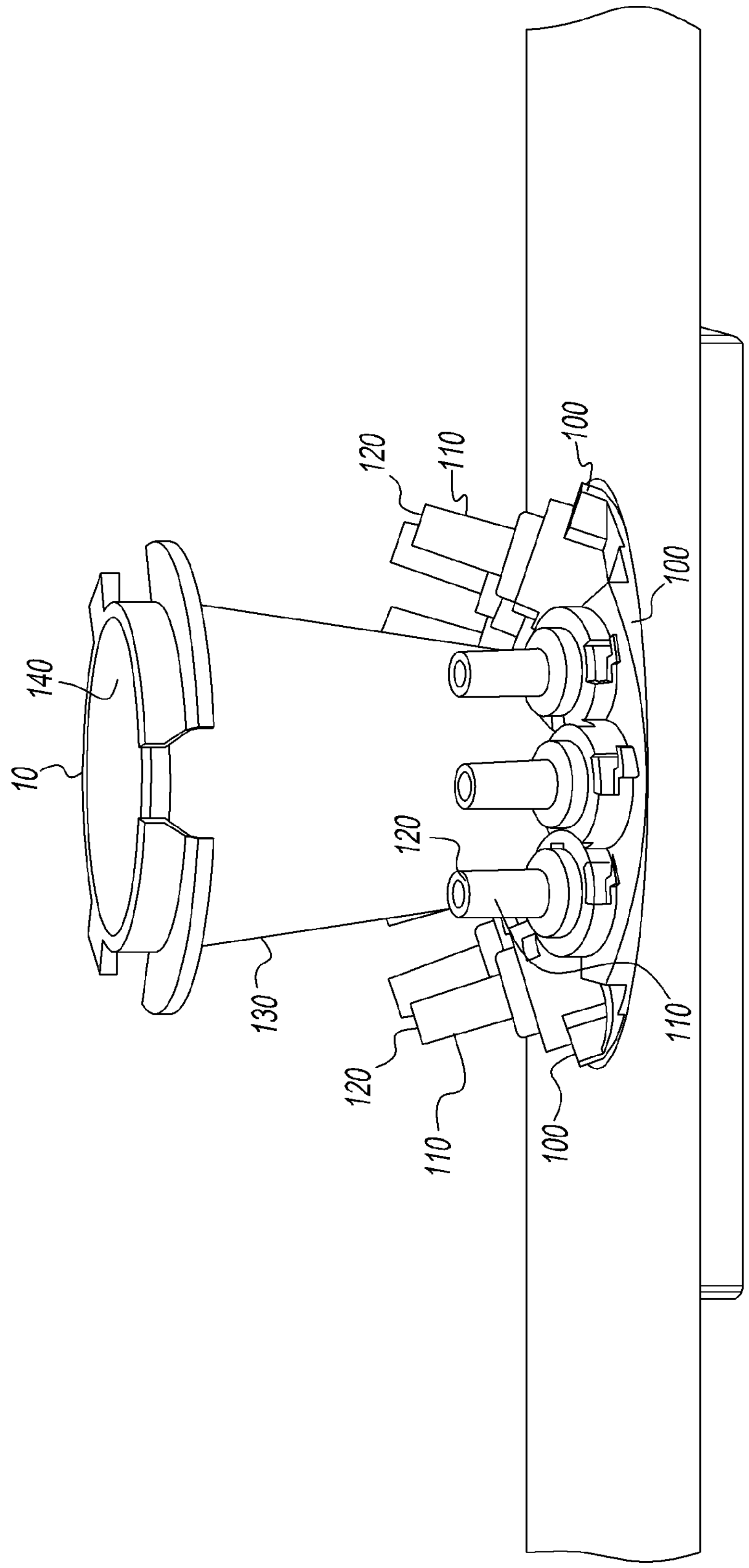
FIG. 1 is a perspective view of an integrated beverage blending system including an ice chute and a manifold having a dispensing valve assembly.

FIG. 1 shows a perspective view of an integrated beverage blending system 10 including an ice chute 130 and a manifold 100 having a dispensing valve assembly. In FIG. 1, integrated beverage blending system 10 includes manifold 100 having three dispensing valves 110. Each dispensing valve 110 has upper end 120 configured to attach to an ingredient conduit (not shown). Each manifold 100 shown in FIG. 1 is comprised of three dispensing valves 110, but other embodiments may have fewer or more dispensing valves 110, or each dispensing valve 110 maybe be an individual dispensing valve 110. Manifold 100 is affixed to bottom plate 400 (see, FIG. 4) below which insert 200 (see, FIG. 2) and LMS valve 300 (see, FIG. 3) are disposed and inserted into dispensing valves 110. Integrated beverage blending system 10 also includes ice chute 130, having opening 140 therein for accepting ice from an ice dispensing mechanism (not shown).

Figure 2:
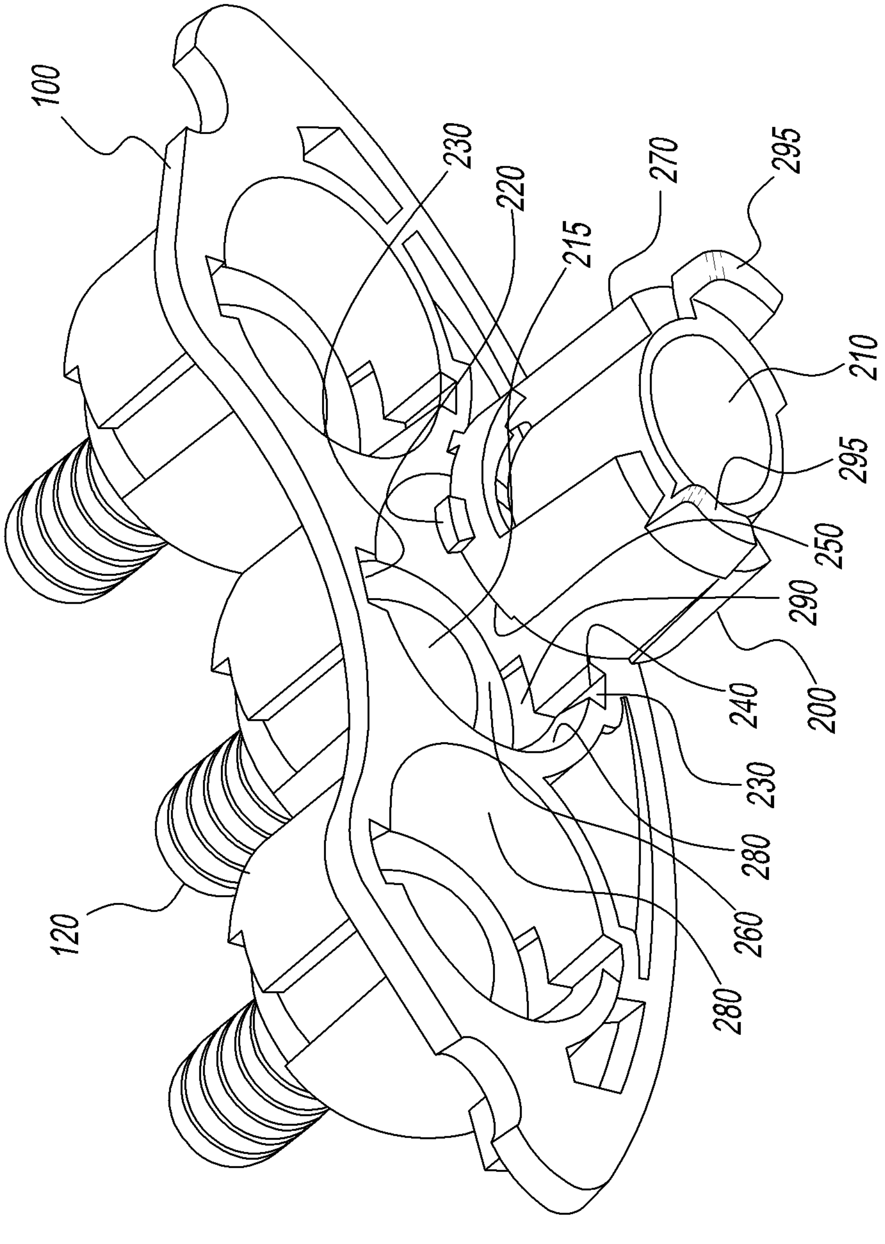
FIG. 2 is a bottom exploded perspective view of a manifold of FIG. 1 showing an insert not in place in a dispensing valve of the manifold (LMS valve not shown)

FIG. 2 shows a bottom exploded perspective view of manifold 100 and insert 200 not in place in dispensing valve 110 of manifold 100, wherein the LMS valve is not shown. In FIG. 2, manifold 100 and insert 200 are shown just prior to insertion of insert 200 into manifold 100. Insert 200 includes opening 210 passing therethrough which is in communication with opening 215 of dispensing valve 110. Insert 200 is also provided with keys 220 (only one key shown in FIG. 2), which engagingly fit into similarly-sized key openings 230 on the bottom side of manifold 100. Each key opening 230 has associated with it channel 240, and key 220 slides into channel 240 until upper surface 250 of insert 200 is adjacent flange 260 disposed on lower inside edge of dispensing valve 110. As will be explained in conjunction with other FIGS., disposed between upper surface 250 and flange 260 is LMS valve 300. Insert 200 has an outer surface 270 sized and configured to fit into inner surface 280 of dispensing valve 110. Associated with each channel 240 is upper opening 290, the purpose of which will be explained herein below in conjunction with other FIGS. During installation, insert 200 is mated to dispensing valve 110 such that opening 215 of dispensing valve 110 is in fluid communication with opening 210 of insert 200. By aligning keys 220 with key openings 230 and sliding insert 200 into dispensing valve 110 along channels 240, LMS valve 300 is tightly secured between upper surface 250 of insert 200 and flange 260 of dispensing valve 110. Thereafter, insert 200 is rotated so that keys 220 engage upper openings 290. Insert 200 is also provided with tabs 295 which serve to provide gripping areas for rotation of insert 200 during installation and removal of insert 200 from dispensing valve 110.

Figure 3:
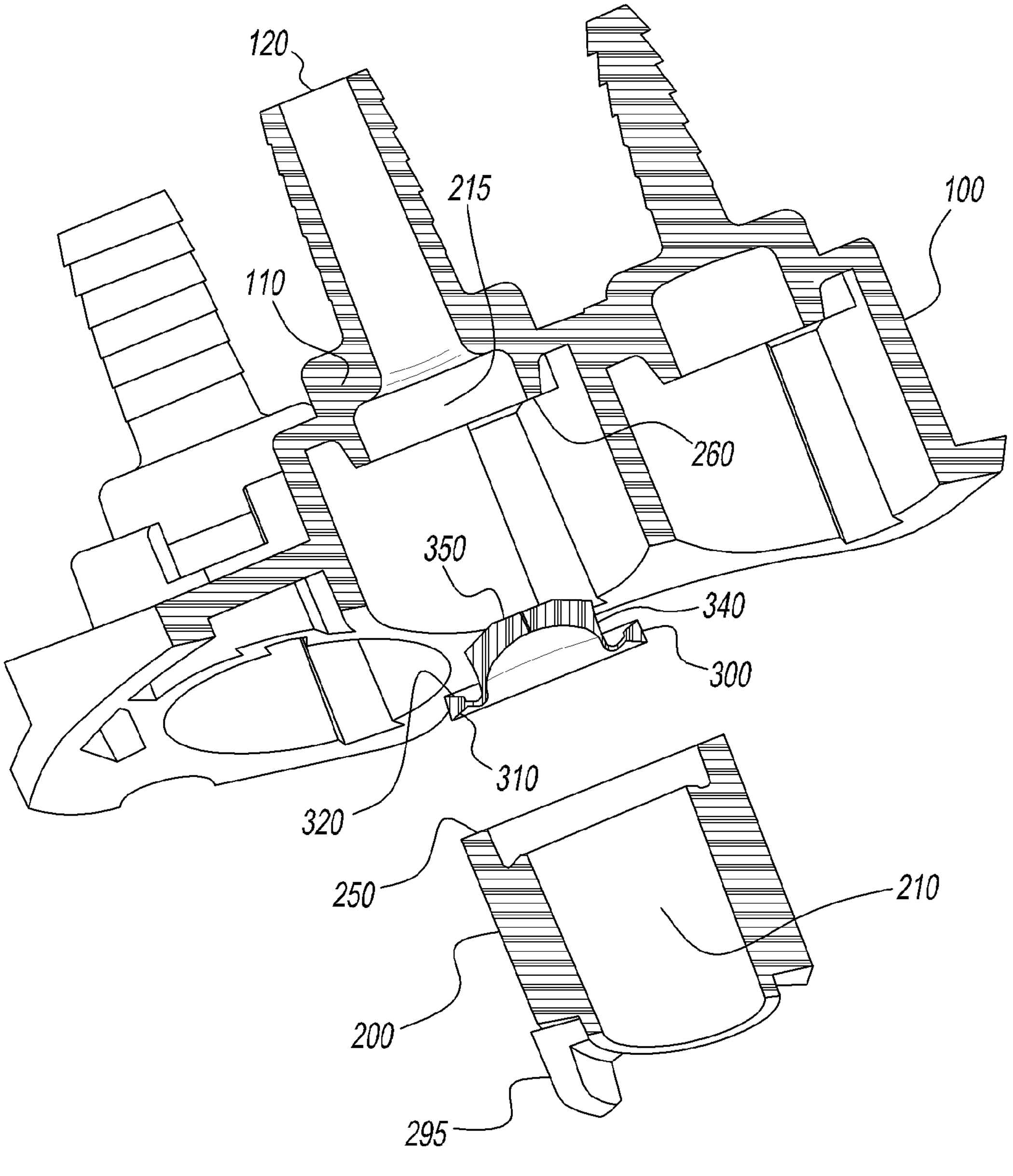
FIG. 3 is an exploded partial cross-sectional side view of a manifold of FIG. 1 showing an insert not in place in a dispensing valve of the manifold, with LMS valve shown.

FIG. 3 shows an exploded partial cross-sectional side view of manifold 100 showing insert 200 again not in place in dispensing valve 110 of manifold 100, but with LMS valve 300 shown. In FIG. 3, insert 200 and LMS valve 300 are in position to be inserted into dispensing valve 110 of manifold 100. LMS valve 300 has lower edge 310, which is sized and configured to mate against upper surface 250 of insert 200. LMS valve 300 also has upper edge 320, which is sized and configured to mate against flange 260 of dispensing valve 110. LMS valve 300 also has upper portion 340, which is sized and designed to fit within opening 215 of dispensing valve 110. Upper portion 340 of LMS valve 300 is provided with curved surface 350. Curved surface 350 is shaped so that it is convex with respect to upper end 120 of dispensing valve 110. During installation, upper edge 320 of LMS valve 300 abuts flange 260 of dispensing novel 110 and lower edge 310 of LMS valve 300 abuts upper surface 250 of insert 200. Then, as described above, with respect to FIG. 2, keys 220 engage openings 230 and channels 240 of dispensing valve 110. As insert 200 slides along the length of channels 240, lower edge 310 of LMS valve 300 seals against surface 250 of insert 200 and upper edge 320 of LMS valve 300 seals against flange 260 of dispensing valve 110. Then, as insert 200 is rotated and keys 220 engage upper opening 290 of dispensing valve 110, LMS 300 valve is securely held in place.

Figure 4:
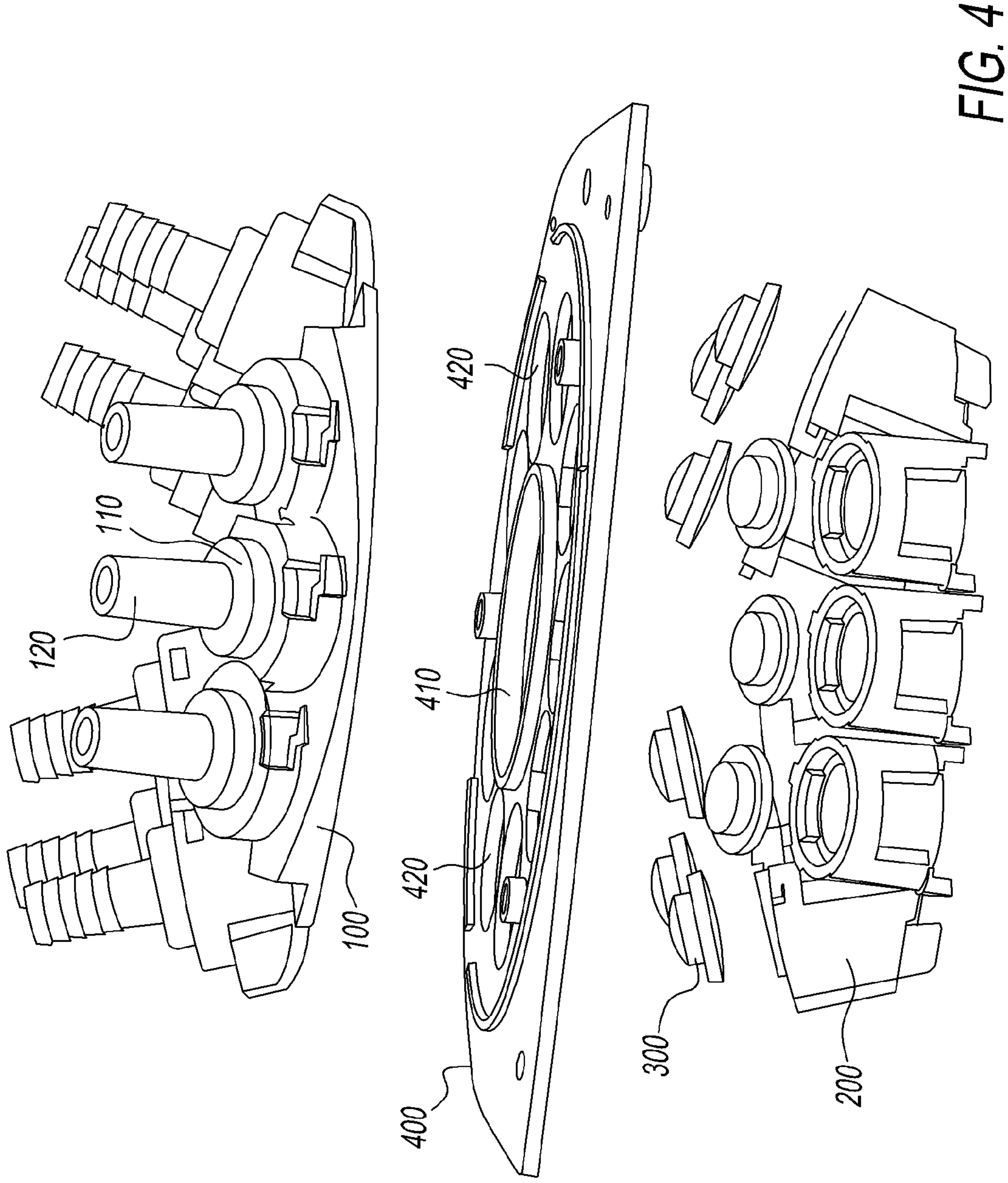
FIG. 4 is an exploded side view of a plurality of valve assemblies of FIG. 3 with a bottom plate disposed therebetween.

FIG. 4 shows an exploded side view of a plurality of valve assemblies in which a plurality of manifolds 100 and dispensing valves 110 are shown in conjunction with matching inserts 200 and LMS valves 300. FIG. 4 also shows bottom plate 400 disposed between the plurality of manifolds 100, dispensing valves 110, inserts 200 and LMS valves 300. Bottom plate 400 has opening 410, which is suitably sized and placed so as to accommodate ice chute 140 (not shown in FIG. 4), thereby providing opening 410 for ice to pass through and into a dispensing cup (not shown). Bottom plate 400 also has openings 420 spaced and sized to accommodate placement of inserts 200 and LMS valves 300 so that inserts 200 and LMS valves 300 can fit into opening provided by inner surface 280 of dispensing valve 110. In the embodiment shown in FIG. 4, each manifold 100 comprises three dispensing valves 110. And, in the embodiment shown in FIG. 4, bottom plate 400 accommodates three (3) manifolds 100, thereby providing for nine (9) dispensing valves 110, and, likewise, nine (9) inserts 200 along with nine (9) LMS valves 300.

Figure 5:
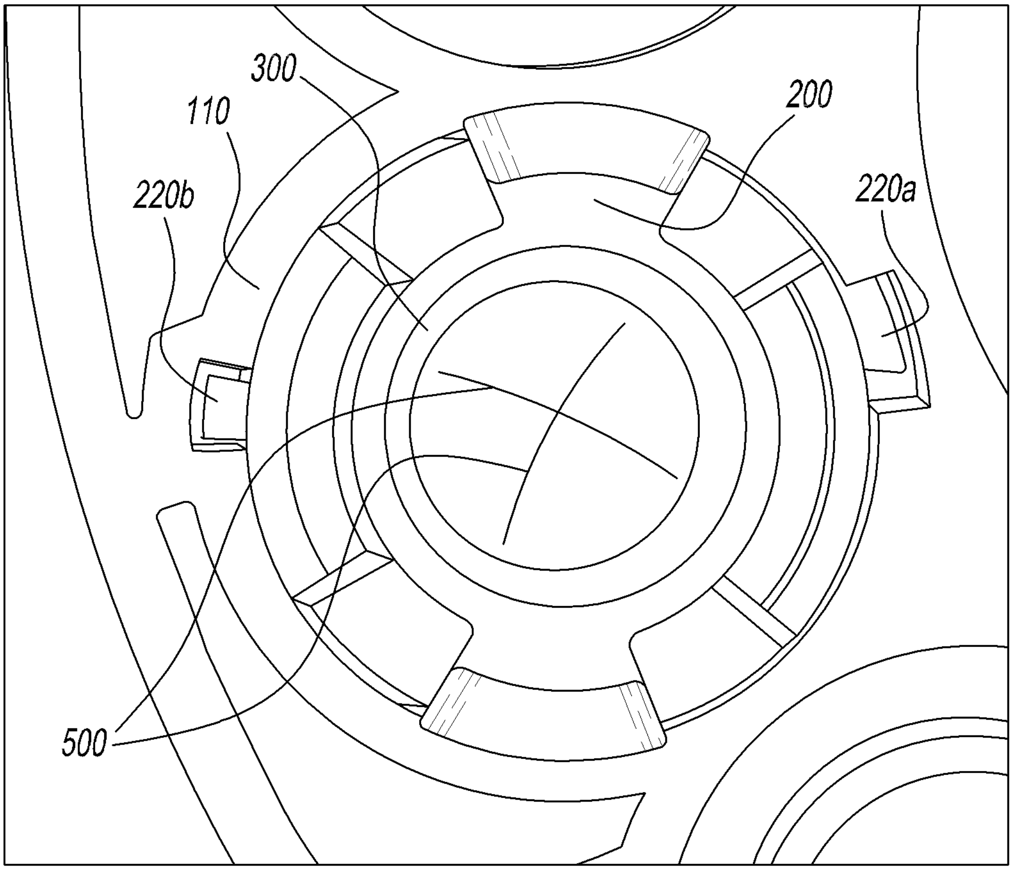
FIG. 5 is a bottom view of an insert in place in a dispensing valve with an LMS valve therebetween.

FIG. 5 shows a bottom view of insert 200 in place in dispensing valve 110 with LMS 300 disposed between. As shown in FIG. 5, insert 200 has been inserted into dispensing valve 110, thereby trapping LMS valve 300 between upper surface 250 (see, FIG. 3) of insert 200 and flange 260 (see, FIG. 3) of dispensing valve 110. In the embodiment shown in FIG. 5, keys 220 are of two different sizes, i.e., large key 220A and small key 220B. In addition, large key 220A and small key 220B are shown as partially rotated into openings 290 (see, FIG. 2) of dispensing valve 110. Also shown in FIG. 5, curved surface 350 of LMS valve 300 is provided with slits 500. Although as shown in FIG. 5 slits 500 are in an "X" pattern, this is not necessarily required. Slits 500 allow for passage of a beverage (not shown) from dispensing valve 110 into and through insert 200 into a dispensing cup (not shown).

Figure 6:
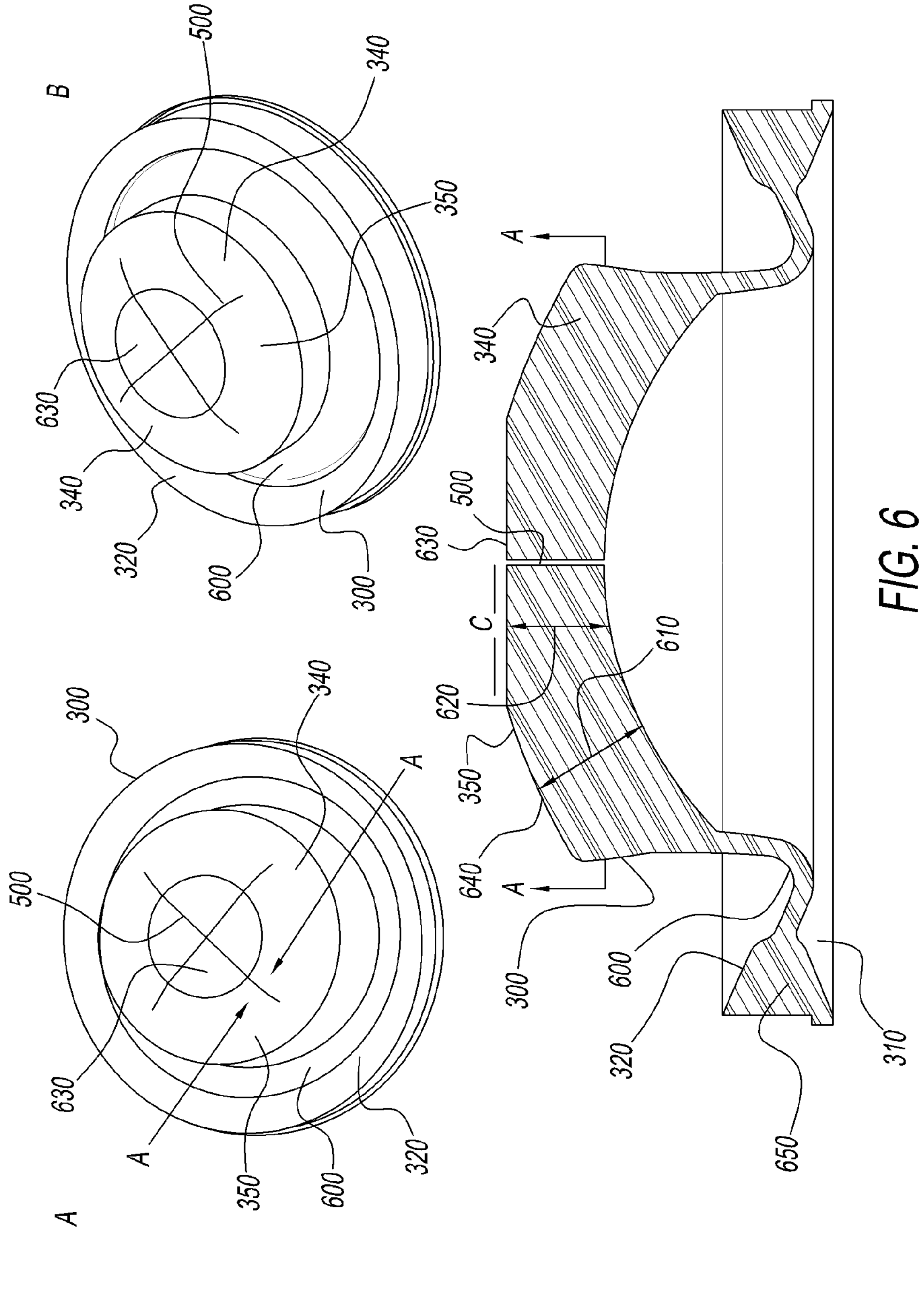
FIGS. 6A-6C are various views of an LMS valve of FIG. 3.

FIGS. 6A-6C show a top view, a perspective view and cross-sectional view through line "A"-"A", respectively, of an embodiment of LMS valve 300. In FIGS. 6A-6C, like numerals are used to identify like elements from the previous FIGS. Focusing on FIG. 6C, there is shown a cross sectional view through line "A"-"A" from FIG. 6A. FIG. 6C shows additional details of LMS valve 300. LMS valve 300 includes neck 600 that connects upper portion 340 of LMS valve 300 to flange 650 that includes bottom edge 310 and top edge 320. Neck 600 provides flexibility so that flange 650 may be conformably maintained so that bottom edge 310 abuts upper edge 250 of insert 200 and upper edge 320 abuts flange 260 of dispensing valve 110 (see, FIG. 7). Upper portion 340 of LMS valve 300 further includes center width 610 and peripheral width 620. Center width 610 is smallest adjacent to slot 500 and gradually increases as distance increases along line C, the distance between slot 500 and end of flat surface 630 of upper portion 340 of LMS valve 300. Along curved (or angled) surface 640 of upper portion 340 of LMS valve 300, peripheral width 620 is provided and remains relatively constant. This configuration of upper portion 340 of LMS valve 300 provides flexibility to upper portion 340 of LMS valve 300 such that beverage impinging upon upper portion 340 of LMS valve 300 will deflect upper portion 340, so that beverage may pass through slit(s) 500. The relative dimensions of widths 610 and 620 depend of course upon the material from which LMS valve 300 and, particularly, upper portion 340 is made. The stiffer or less flexible the material from which LMS valve 300 is made, the smaller widths 610 and 620 may be. The configuration of flange 650 is a mere matter of convenience and engineering such that lower surface 310 and upper surface 320 of LMS valve 300 may easily engage and seal against upper edge 250 of insert 200 and flange 260 of dispensing nozzle 110. Other configurations will of course suggest themselves to those of skill in the art based upon the foregoing.

Figure 7:
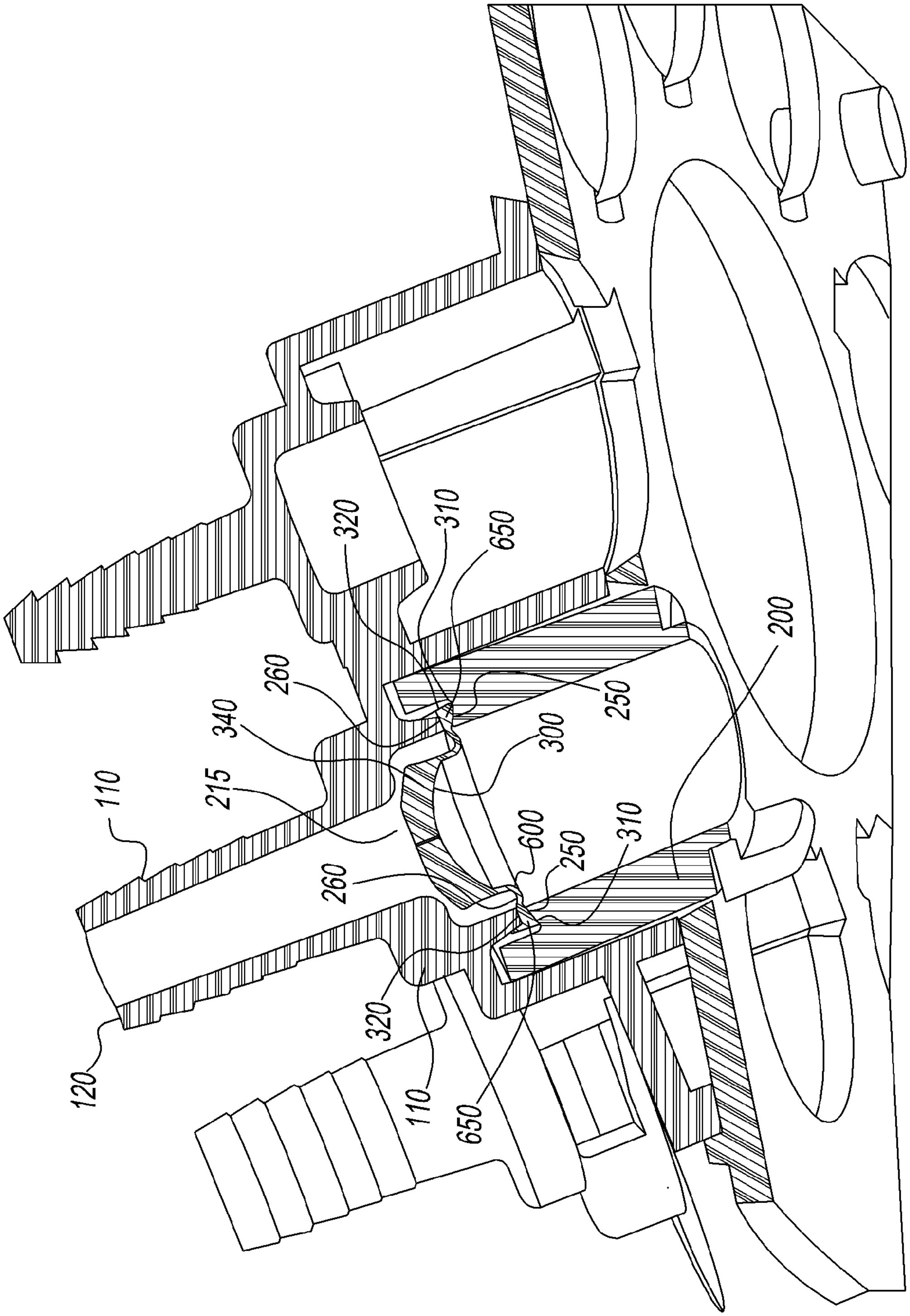
FIG. 7 is a partial cross-sectional view of an assembled valve assembly of FIG. 4.

FIG. 7 shows dispensing valve 110, insert 200 and LMS valve 300 assembled and in locked position. In operation, beverage dispensing conduit (not shown) is connected to upper end 120 of dispensing valve 110. As beverage is dispensed, it proceeds through opening 215 in dispensing valve 110 until it meets upper portion 340 of LMS valve 300. Because beverage is under pressure (as discussed above), upper surface 340 of LMS valve 300 deflects in a direction away from upper end 120 of dispensing valve 110 and beverage passes through slit(s) 500 and into opening 210 of insert 200. Any beverage not passing through slits 500 is prevented from leaking due to the seal provided by the mating of lower surface 310 and upper surface 320 of LMS valve 300 against flange 250 of dispensing valve 110 and upper edge 260 of insert 200, respectively. Beverage passes through opening 210 of insert 200 and into dispensing cup (not shown).

Figure 8:
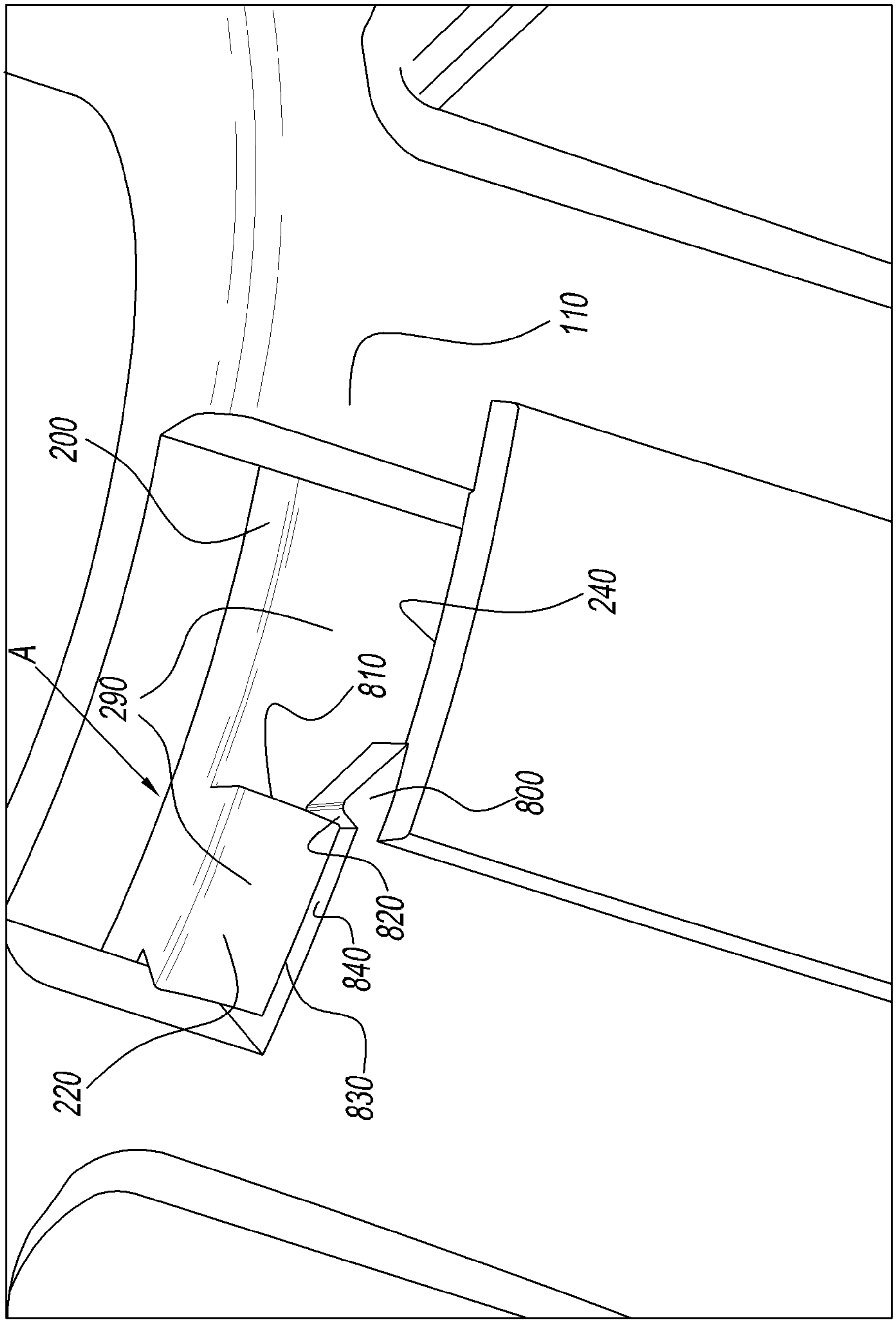
FIG. 8 is a side view of a detail of valve assembly having an insert in place.

FIG. 8 shows a detail of a locking mechanism according to the present disclosure. In FIG. 8, key 220 (either large key 220A or small key 220B) of insert 200 has traversed channel 240 of dispensing valve 110, and has reached opening 290 of dispensing valve 110. When insert 200 is in this position, it is rotated (in this case clockwise, looking down from the direction indicated at "A" in FIG. 8), and key 220 meets protrusion 800 (in this case shaped in the form of a an incline). As trailing edge 810 of key 220 reaches end 820 of protrusion 800, key 220 (and insert 200) drop into place until bottom edge of key 830 contacts surface 840 on dispensing valve 110. At this point, key 220 is locked into position and 200 held tightly in locked position since protrusion 800 prevents insert 200 from rotating in an opposite direction. Although protrusion 800 is configured in FIG. 8 as an incline, those skilled in the art will appreciate that protrusion 800 can be of any shape or form so long as it serves the purpose of contacting trailing edge 810 and locking key 220 in position such that insert 200 is prevented from rotating in an opposite direction. Of course, it is possible to omit both key 220 and protrusion 800 in certain embodiments of the present disclosure. This is particularly true in those embodiments where insert 200 is threaded and screwed into matching threads on dispensing valve 110, or where insert 200 is held in place in dispensing valve 110 by means of a snap fit mechanism.

Figure 9:
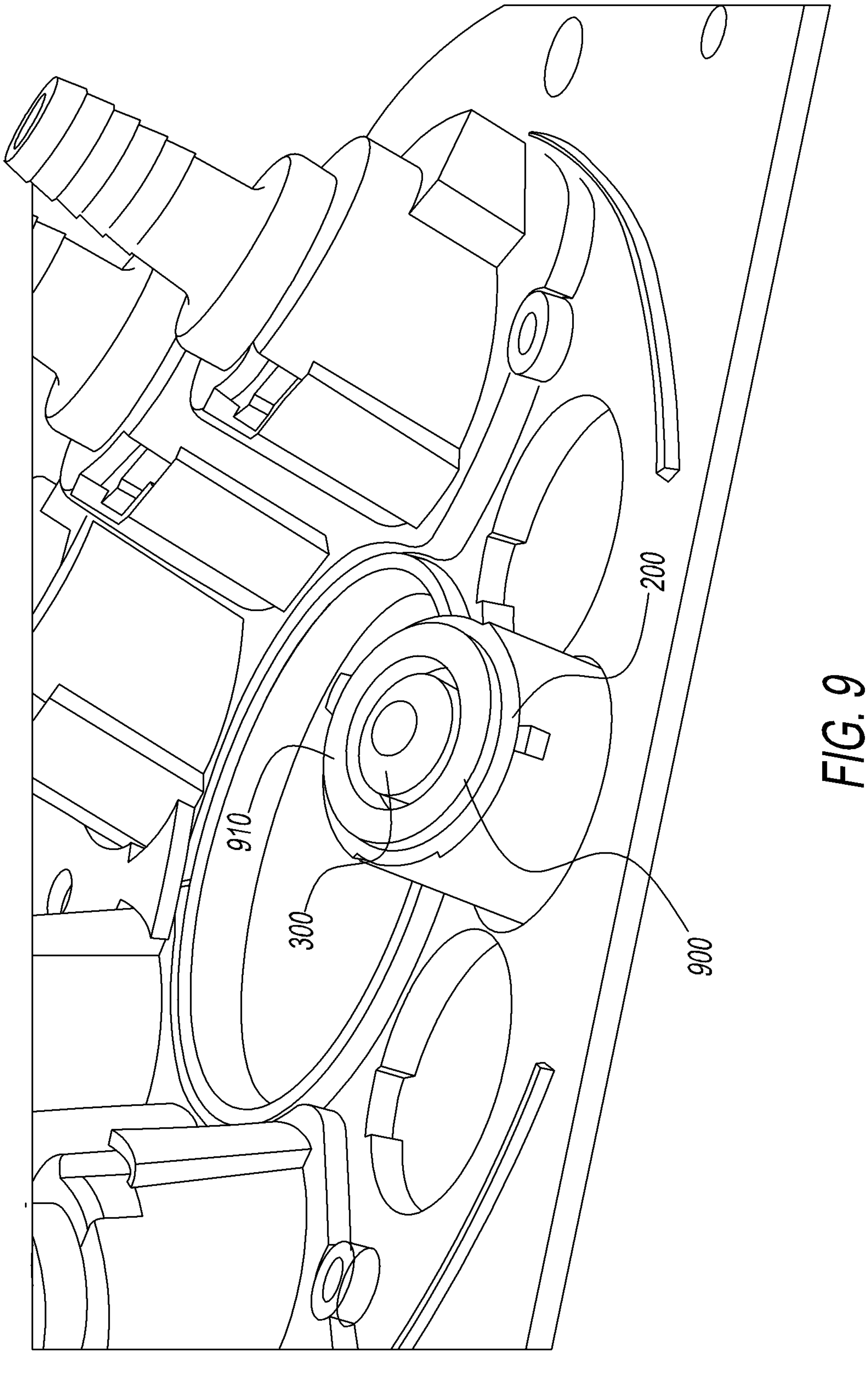
FIG. 9 is an alternative embodiment of the present disclosure.

FIG. 9 shows an alternate embodiment of the present disclosure wherein LMS valve 300 is held in place in insert 200 by the use of ring 900. Ring 900 matingly engages into insert 200 by any of a number of mechanisms. These mechanisms include a screw fit, a snap fit, etc. In the particular embodiment shown, ring 900 snap fits into insert 200 and traps upper edge 320 of LMS valve 300 against lower surface (not shown) of ring 900. Upper surface 910 of ring 900 is designed to abut against flange 260 of dispensing valve 110. In this manner, when insert is placed into dispensing valve 110 according to descriptions previously provided in the present disclosure, LMS valve 300 is sealed in position to receive beverage through dispensing valve 110.

Figure 10:
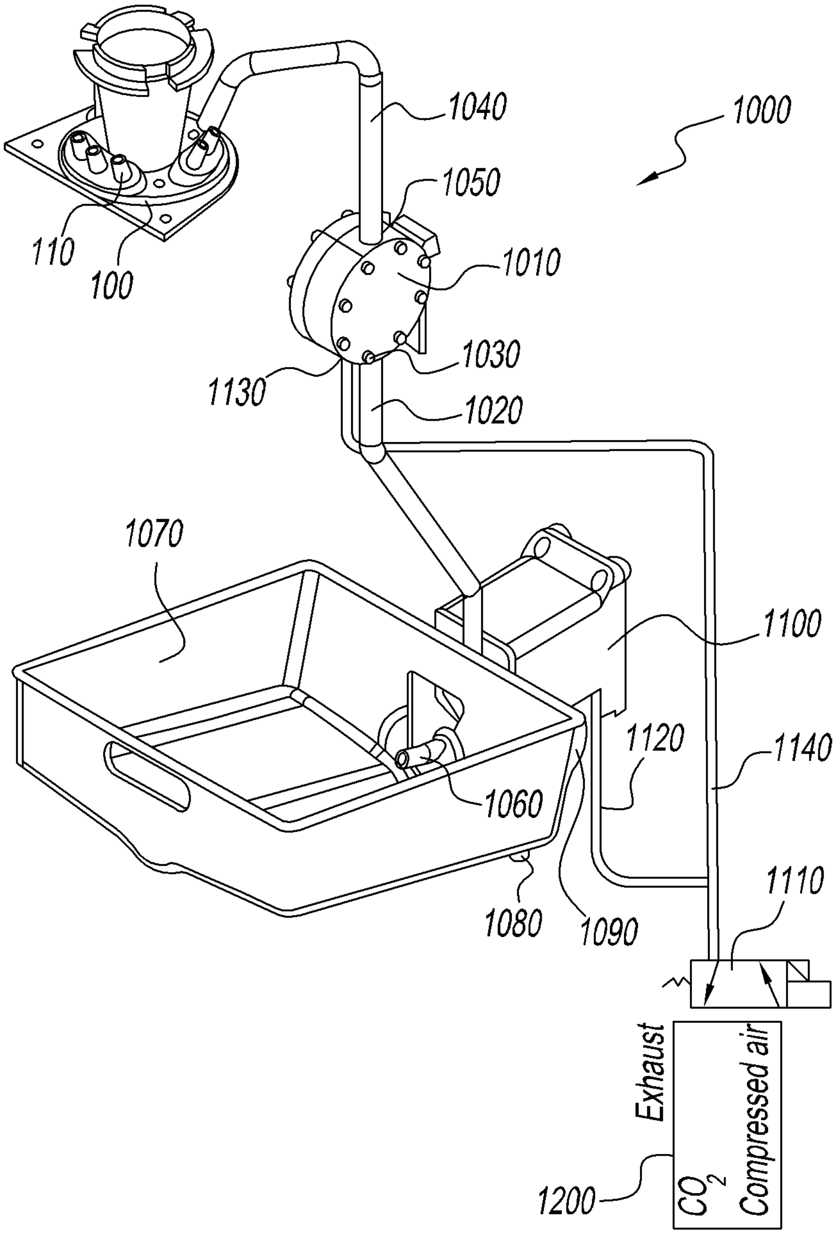
FIG. 10 is a front perspective view of a flavor/ingredient dispensing module.

Referring to FIG. 10, there is shown a front perspective view of a flavor/ingredient dispensing module 1000. Expansion valve 1010 is connected to a line conduit in flavor/ingredient dispensing module (not shown) so that first portion 1020 of line conduit is connected to syrup inlet 1030 upstream of expansion valve 1010 and second portion 1040 of line conduit is connected to product outlet 1050 downstream of expansion valve 1010. Connector 1060 located at the back of holder 1070 can connect flexible containers (not shown) within holder 1070 to connection tube 1080, so that the ingredient flows out of the flexible container (not shown) into one end of connection tube 1080. Connection tube 1080 of each of holder 1070 is connected to conduit 1090 that is connected to one of pumps 1100 that selectively moves a portion of the ingredient from the flexible container (not shown) in holder 1070 through connection tube 1080, to conduit 1090, to first portion 1020 of the line conduit, through expansion valve 1010 to second portion 1040 of the line conduit so that the ingredient can flow to dispensing valve 110 to dispense the ingredient out of the assembly, for example, to a cup (not shown). A source of $CO_2$ or compressed air 1200 is connected to valve 1110 that is connected to pump 1100 via conduit 1120 and $CO_2$/air inlet 1130 via conduit 1140, e.g., a valve that includes a solenoid that opens a first passage for the $CO_2$/air to pass into conduits 1120, 1140 in a first position and closes the passage for the $CO_2$/air to pass into conduits 1120, 1140 in a second position while opening a second passage for exhaust in the second position. Expansion valve 1010 may be retrofitted into a flavor/ingredient dispensing module, for example, by placing expansion valve 1010 along the flow path of the ingredient from the flexible container (not shown) in holder 1070 to dispensing valve 110. Connector 1060 located at the back of holder 1070 can connect the flexible containers within holder 1070 to connection tube 1080 that is also at the back of ingredient housing (not shown), so that the ingredient can be dispensed into a cup in the manner described above.

Figure 11:
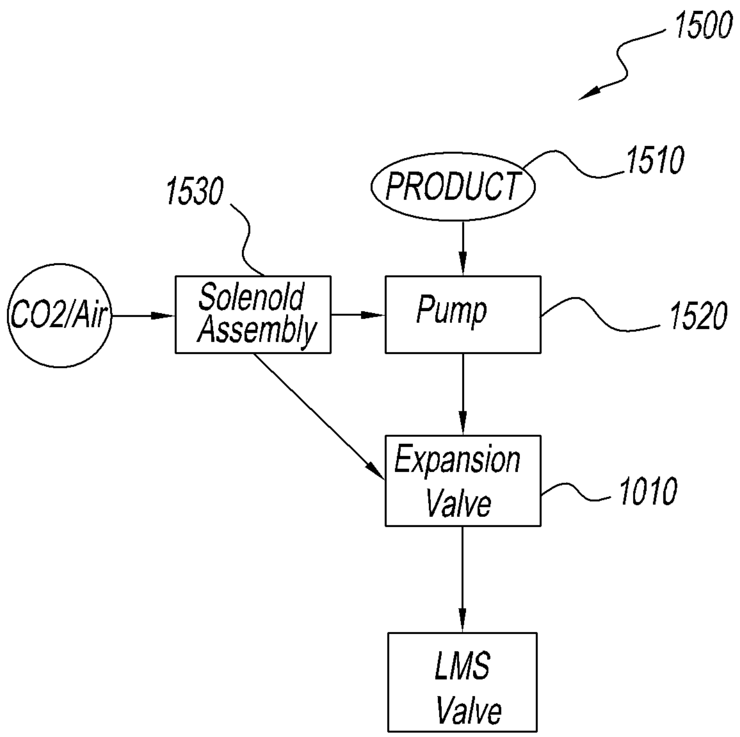
FIG. 11 is a block diagram of the ingredient pumping system used with the ingredient dispensing module.

FIG. 11 is a block diagram of the ingredient pumping system 1500 used with the ingredient dispensing module in accordance with the present disclosure, wherein product 1510 in the form of, e.g., syrup, is introduced into pump 1520 that is activated by solenoid assembly 1530. Thereafter, product 1510 is passed from pump 1520 into expansion valve 1010 and simultaneously $CO_2$/air (pressurized) 1200 is passed to expansion valve 1010. Thereafter, product 1510, e.g., syrup and/or pressurized $CO_2$/air 1100 are passed into LMS valve 300 for dispensing.

It should also be noted that the terms “first”, “second”, “third”, “upper”, “lower”, and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A beverage system comprising:

an ingredient module; and an ingredient dispensing valve assembly in communication with the ingredient module via at least one ingredient conduit, wherein said ingredient dispensing valve assembly comprises:

a dispensing manifold with at least one dispensing valve having a body portion with a through-hole;

an insert disposed within said through-hole, wherein said insert has a grippable area external to said through-hole; and a valve disposed between said insert and said dispensing valve, wherein said insert can be manually inserted into and removed from said through-hole using said grippable area, wherein said insert is secured to said body portion of said dispensing valve by a locking mechanism, and wherein said locking mechanism provides for removing or securing said valve from between said body portion of said dispensing valve and said insert without the use of tools.

2. The system according to claim 1, wherein said locking mechanism is selected from the group consisting of a twist-and-lock, screw thread, snap fit, friction fit and combinations of one or more of any of the foregoing.

3. The system according to claim 1, wherein the locking mechanism is a twist and lock mechanism and further comprises a mechanism to prevent the insert from rotating out of position.

4. The system according to claim 1, wherein the ingredient module comprises a housing, an ingredient container disposed within the housing, said ingredient conduit disposed between the ingredient container and the at least one dispensing valve, and a pumping device that causes the ingredient to move from the ingredient container, through the ingredient conduit, and through the at least one dispensing valve under pressure.

5. An ingredient dispensing valve assembly comprising:

a dispensing valve having body portion with a through-hole;

an insert disposed within said through-hole, wherein said insert has a grippable area external to said through-hole; and a valve disposed between said insert and said dispensing valve, wherein said insert can be manually inserted into and removed from said through-hole using said grippable area, wherein said insert is secured to said body portion of said dispensing valve by a locking mechanism, and wherein said locking mechanism provides for removing or securing said valve from between said body portion of said dispensing valve and said insert without the use of tools.

* * * * *